US009128928B2

(12) United States Patent
Lee et al.

(10) Patent No.: US 9,128,928 B2
(45) Date of Patent: *Sep. 8, 2015

(54) MEMORY METHOD AND APPARATUS WITH BUTTON RELEASE

(71) Applicant: Seagate Technology, LLC, Cupertino, CA (US)

(72) Inventors: Mike Lee, San Jose, CA (US); Faheem Dani, San Jose, CA (US); Don Brunnett, Pleasanton, CA (US); Prokash Sinha, Morgan Hill, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,966

(22) Filed: Jan. 6, 2014

(65) Prior Publication Data
US 2014/0223035 A1    Aug. 7, 2014

Related U.S. Application Data

(63) Continuation of application No. 11/249,044, filed on Oct. 11, 2005, now Pat. No. 8,626,971.

(60) Provisional application No. 60/617,256, filed on Oct. 8, 2004.

(51) Int. Cl.
| G06F 13/00 | (2006.01) |
| G06F 13/28 | (2006.01) |
| G06F 11/30 | (2006.01) |
| G06F 13/38 | (2006.01) |
| G06F 13/10 | (2006.01) |
| G06F 3/06  | (2006.01) |

(52) U.S. Cl.
CPC ............ *G06F 13/28* (2013.01); *G06F 11/3065* (2013.01); *G06F 13/385* (2013.01); *G06F 3/067* (2013.01); *G06F 13/10* (2013.01)

(58) Field of Classification Search
CPC .................................. G06F 13/10; G06F 3/067
See application file for complete search history.

(56) References Cited

U.S. PATENT DOCUMENTS

| 5,754,844 | A  | 5/1998  | Fuller |
| 6,955,292 | B2 | 10/2005 | Nakamura et al. |
| 7,136,951 | B2 | 11/2006 | Deng et al. |
| 2003/0196167 | A1 | 10/2003 | Dewar |
| 2003/0221040 | A1 | 11/2003 | Yamada et al. |
| 2004/0136224 | A1* | 7/2004 | Hamer et al. ................. 365/145 |
| 2004/0165211 | A1 | 8/2004 | Herrmann et al. |
| 2004/0229681 | A1 | 11/2004 | Romano |
| 2004/0252604 | A1 | 12/2004 | Johnson et al. |
| 2005/0160223 | A1* | 7/2005 | Chen et al. .................... 711/115 |

FOREIGN PATENT DOCUMENTS

WO    WO 2006000039 A1    1/2006

* cited by examiner

Primary Examiner — Zachary K Huson

(57) ABSTRACT

A flash memory device apparatus and method is provided such that data or programming information is uploaded or downloaded between the flash memory device and a host, in response to a single-press of a button associated with the flash memory device. The system can facilitate a number of operations including saving an active window application or associated data, transferring media files to or from media players, providing device-specific and/or data-specific transfer of applications or data and/or providing protection of transferred data or applications.

22 Claims, 8 Drawing Sheets

MEMORY METHOD AND APPARATUS WITH BUTTON RELEASE

CROSS-REFERENCE TO RELATED APPLICATION

This application claims priority from U.S. Provisional Application Ser. No. 60/617,256 filed Oct. 8, 2004, and U.S. Nonprovisional Application Ser. No. 11/249,044 filed on Oct. 11, 2005 expected to issue on Jan. 7, 2014 as U.S. Pat. No. 8,626,971, all of which are incorporated herein by reference in their entirety.

FIELD OF THE INVENTION

The present invention is directed to a flash memory peripheral which can accommodate various data or programming transfers. In particular, the present invention is directed to a flash memory peripheral which communicates with a host for data or programming transfer(s) in response to a button press.

BACKGROUND INFORMATION

Many computer peripherals are designed for user input, such as keyboards, mice and the like. Flash memory peripherals have typically been substantially passive, from the point of view of the host, in the sense that typical flash memory peripherals do not receive user input for initiating communication with the host. As used herein, a flash memory peripheral or device communicates directly with a host device such as via a USB connection, "firewire" connection, wireless connection or the like. It is believed that this typical configuration has led to the absence of a number of potentially useful implementations of flash memory peripherals. Accordingly, it would be useful to provide non-passive flash memory peripherals for performing functions in cooperation with a host device.

One relatively popular application for flash memory has been in connection with portable media players such as portable MP3 players, portable video players and the like. At least some of such devices can be coupled to a computer or other host device such as via a Universal Serial Bus (USB) or other connection. Typically, an MP3 player will have user-activatible controls such as for selecting songs, adjusting volume and the like. However, such controls typically control the operation of the player and do not initiate functions in cooperation with the host such as downloading of "content", e.g., MP3 files, video files and the like. In at least some configurations, a download (from the host to the peripheral) of files is initiated by the host, in response to, e.g., keyboard or mouse activations (i.e., not in response to user activation of flash peripheral controls, if any). This is believed to represent an inconvenience to the user. Accordingly, it would be useful to provide a flash peripheral which can initiate a backup or download to itself, without the need to move to, or shift focus to, host input devices not associated with the flash peripheral. In this regard, it is believed useful to distinguish between data backup, which preserves a copy of desired files (e.g., in case the original file is corrupted) and synchronization, such as provided in programs like Microsoft® Briefcase which is used to synchronize files, e.g., modify a portable computer or personal digital assistant (PDA) with their counterparts on a main computer.

User controls on an MP3 player, as well as user input devices of a host computer, typically require multiple steps or actions to perform a given function (e.g., moving a mouse pointer to a icon or menu item, clicking on a menu item, making sub-menu or other selections by moving the mouse pointer, confirming desired actions and the like). Such multiple-step requirements for a download or other action are typical for host devices such as computers which are designed to have the ability to perform, at a given time, many different functions (and, thus, typically require multiple steps to select and/or configure the desired function). Controls that are configured to require multiple actions, such as multiple button presses or other multiple steps are also typical for an MP3 player which is generally designed to permit selection among a wide range of options (such as selecting desired songs, volume levels and the like) while positioning the controls in a device which has a small physical size. Such multi-step controls are believed, however, to be inconvenient and time consuming, at least for some functions. Accordingly, it would be useful to provide a flash memory peripheral such that a download can be initiated from the peripheral without the need for multiple steps or actions.

Some peripheral devices are configured to perform downloads and/or synchronize content with the host, automatically upon connection to the host (such as by a USB connector or the like). One example is the "auto-sync" function provided for the Apple iPOD®. Although "auto-sync" can be discontinued by making appropriate selections, it is believed that at least some users prefer greater (or at least different) control over download operations and/or may wish to initiate download other than upon connection. Accordingly, it would be useful to provide a flash memory peripheral which does not automatically initialize download upon connection.

SUMMARY OF THE INVENTION

The present invention includes a recognition of the existence, source and nature of problems found in previous approaches, including those described herein.

The present invention relates to an apparatus, to a computer or other electronic system which can use or do use such apparatus, and to methods involving such apparatus. The apparatus provides for a (preferably small or portable) peripheral or other electronic device, generally referred to herein as a flash memory peripheral or device. The flash memory peripheral or device is provided with an associated button, or other user-activatable input. As used herein, a button which is associated with a peripheral is more closely associated with the peripheral device than with the host device, such as being rigidly or flexibly mounted on, or connected to, the peripheral device. Typically, activation of a button associated with a peripheral device will be received and/or processed by the peripheral device before the button press is communicated (if at all) to the host device. The peripheral is capable of single-press functionality, including as described in greater detail below. As used herein, a button, coupled to a device, is capable of a given single-press function if the device is configured (or can be configured or modified) to achieve the given function (possibly in cooperation with a host) in response to a single-press of the button. So long as the device has, or can have, single-press function capability, the capability is not negated or diminished merely because the capability is foregone in favor of a multiple press protocol requirement or the like.

According to one facet of the invention, in response to a single-press of a flash device button, a communication is sent to the host which results in data being downloaded, from the host to the flash device. Preferably, the flash device communicates directly (other than possibly using, e.g., a substantially passive communication component such as a USB hub, a router and the like) with the host. Preferably, no further input (other than the flash device button single-press) from the user is needed in order to identify the data that is to be downloaded. For example, in one embodiment, the system (host, flash device and programming thereof) responds to a single-press of the flash device button by downloading the currently-active file. For example, if the button is pressed while a PowerPoint® presentation is in the active window of a host computer, the data file which is currently the basis for such presentation is downloaded to the flash device. Similarly, if the flash device button is pressed while, e.g., Excel® is the active window of a host computer, the active data file for the displayed spreadsheet will be downloaded. If the button is pressed while a Microsoft® Word document is open, the document in the active window of the Word® program will be downloaded, and so forth. Other manners of selecting the file or files to be downloaded can also be used in various embodiments of the present invention including, e.g., downloading the most-recently opened music files, the most-recently saved video files and the like.

According to one aspect of the invention, in response to a single-press of a flash device button, a communication is sent to the host device which results in downloading of one or more files which are specific to the type of flash device. For example, when the flash device is an MP3 player, the system can be configured to download the most recent MP3 file(s), whereas, if the flash device is a video player, the system can be configured to download the active video data file(s), and the like.

In one facet of the invention, the system can be configured such that, in response to a single-press of a button associated with a flash memory device, communication is established with the host, resulting in an uploading (from the flash device to the host device) of programming information, such as one or more executable files, configuration data, and the like, typically of a type which can be executed on the host. In some configurations, the programming information or applications are data-specific or device-specific. For example, a flash memory device can be provided with pre-loaded music files, which, in response to a single button press, not only uploads the files to the host but also uploads a music player application (preferably, after checking to determine that the application was not already present on the host). In another aspect, a converse configuration is provided in which, in response to a single-press of a button, not only is data downloaded (from the host to the flash device) but also one or more programming files such as an application file, configuration data, and the like, is sent to the flash device. In this way, it is convenient for, e.g., a presenter to provide an audience member with a copy, not only of the presentation, but a viewer or application which will permit the user to view the presentation on his or her own host device. Preferably, the programming information is data and/or device-specific such that, e.g., if a video file is downloaded, the system also downloads, from the host, a video "viewer" application. In one aspect, if the flash device is, e.g., an MP3 player, the system downloads to the flash device, not only MP3 data but also programming data such as configuration information (e.g., specifying sound playback quality, volume level and the like).

According to one facet of the invention, in response to a single-press of a memory device button, communication is sent to the host which results not only in download, to the flash memory device, of data and/or programming information, but also provides for data security (such as encryption and/or setting "read only" flags) with respect to the downloaded data (without the need for further user input, in order to achieve such security).

According to one aspect of the invention, a flash memory device apparatus and method is provided such that data or programming information is uploaded or downloaded between the flash memory device and a host, in response to a single-press of a button associated with the flash memory device. The system can facilitate a number of operations including saving an active window application or associated data, transferring media files to or from media players, providing device-specific and/or data-specific transfer of applications or data and/or providing protection of transferred data or applications.

DETAILED DESCRIPTION OF THE PREFERRED EMBODIMENTS

Figure 1:
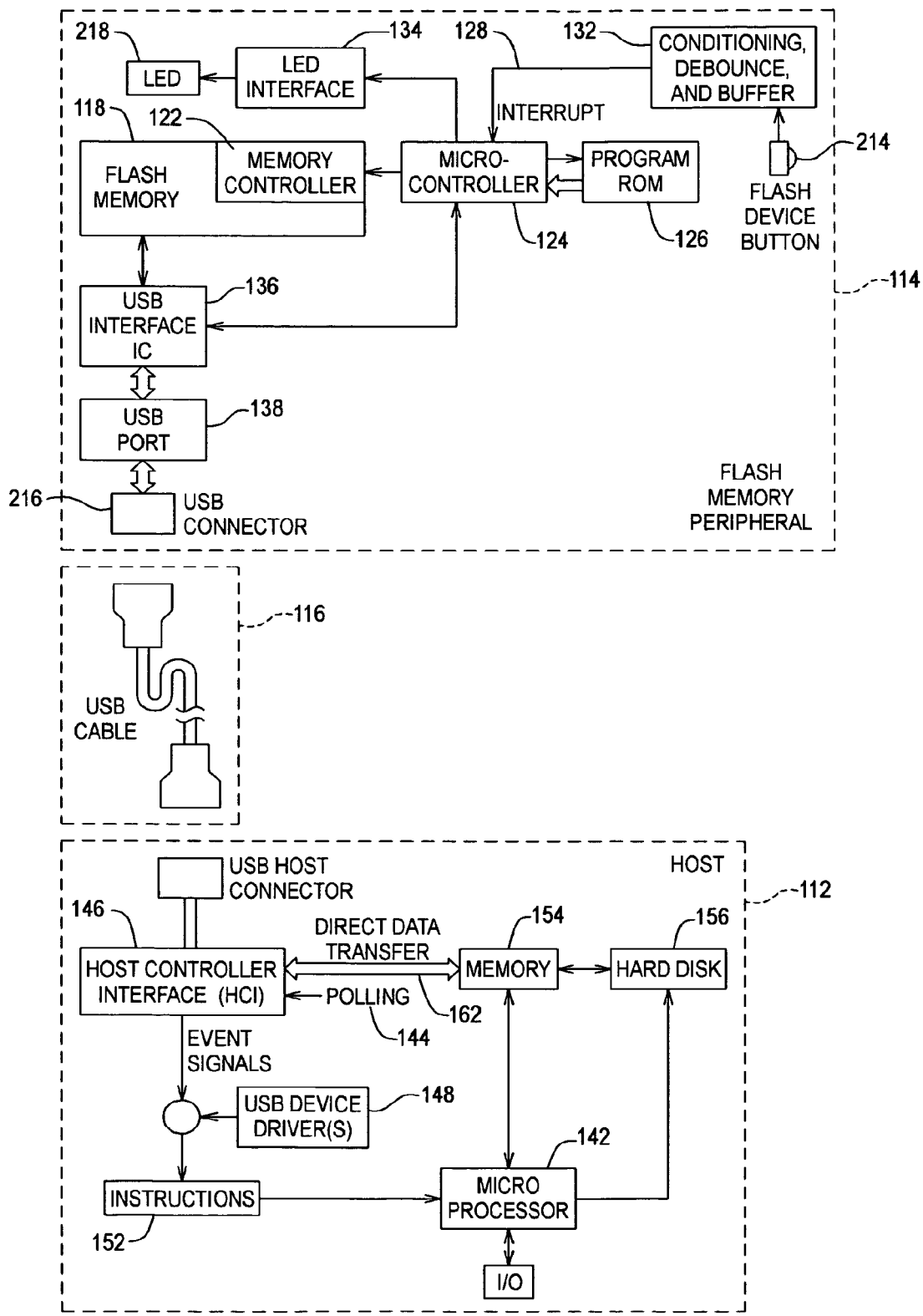
FIG. 1 is a block diagram showing selected components of a system that can be used in accordance with embodiments of the present invention.

FIG. 1 depicts, in schematic block diagram form, an apparatus which can be used in connection with an embodiment of the present invention, including a host 112 and a flash memory peripheral 114, such as a flash drive and the like, connected by a universal serial bus (USB) cable 116. Host 112, depicted in FIG. 1, can be substantially any personal computer provided with communications capability, such as USB connection capabilities and programming for performing functions as described below. Although FIG. 1 depicts a cable 116 used to connect the flash memory peripheral 114 to the host 112, the present invention can also be used in situations where the flash memory peripheral 114 is configured to be directly connected to the USB connector of the host 112, i.e., without an intervening cable 116.

Preferably, this device is configured and programmed such that it will recognize the communication connection and/or automatically (e.g., upon connection) load appropriate drivers (possibly uploaded from the flash memory device) and perform other procedures as may be necessary for operating in conjunction with the flash memory device. Those skilled in the art will understand how to provide and use host device programming or operating systems to implement such procedures.

Figure 2:
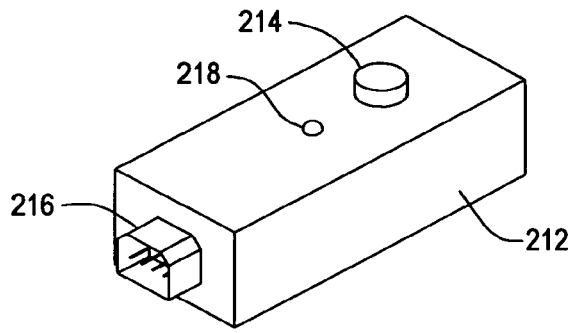
FIG. 2 is a diagrammatic representation of a perspective view of a flash memory device according to an embodiment of the present invention.

Selected components of the host 112 and peripheral 114 are depicted to assist in description of the system and its use. The flash memory peripheral 114 contains a flash memory 118 typically with a memory controller 122. The flash memory 118 is typically provided on a single integrated circuit (IC) and enclosed, with a number of other components, in a housing 212, such as depicted in FIG. 2. The housing 212 has coupled to it a user activatible input such as a button 214 and, in the depicted embodiment, a USB connector 216. In the embodiment depicted in FIG. 2, a signaling component, such as a controllable LED 218, is mounted on the housing 212.

The flash memory 118 is substantially controlled by a controller such as a programmable microcontroller 124 which can access microinstructions, e.g., from a memory such as program ROM 126. In the depicted embodiment, microcontroller 124 can receive an interrupt signal 128 initiated by a press of the button 214 with conditioning, de-bounce and buffering 132. The microcontroller 124 can control the LED 218, e.g., via an LED interface 134. A USB interface IC 136 communicates with the microcontroller 124 and, in the depicted embodiment, can send and receive data to and from the flash memory 118. The USB interface IC maintains proper values for the voltage and ground lines of the USB output and outputs digital signals (control signals or data and the like) on first and second differential signal lines of the USB system, via a USB port 138 and USB connector 216.

Although the depicted flash memory peripheral differs from prior devices in a number of ways including in the provision and/or functioning of the button 214 and responses thereto, those of skill in the art will understand how to fabricate, select, connect and/or program components appropriate for use in connection with the present invention, at least after understanding the present disclosure.

Figure 3:
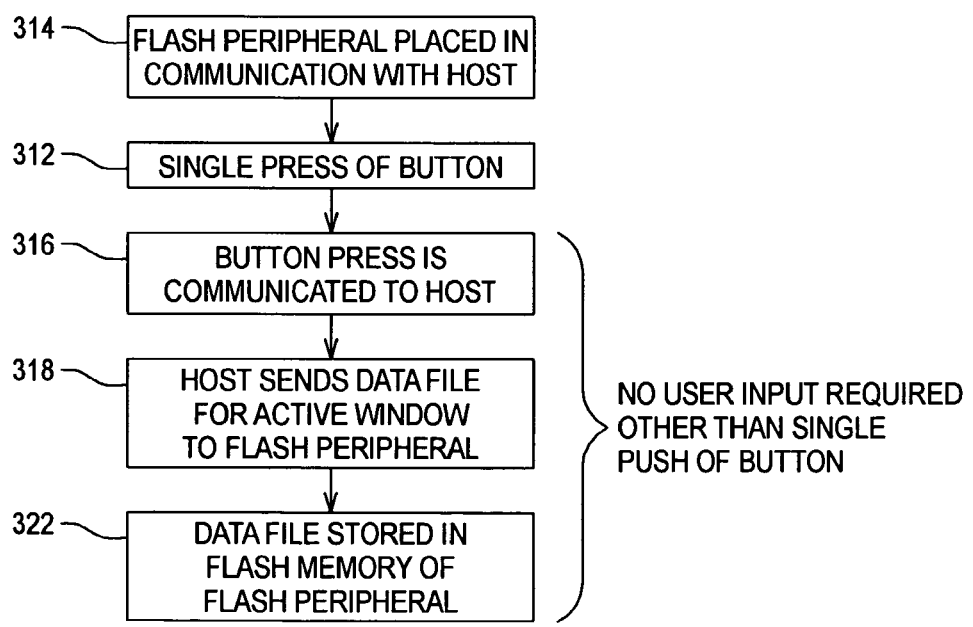
FIG. 3 is a flowchart of a process showing response to a single-press of a button associated with a flash memory device according to an embodiment of the present invention.

According to one embodiment of the invention, and as illustrated in FIG. 3, in response to a single-press of the button 214 on the flash memory device 212, which has been placed in communication with the host 314, the information regarding the occurrence of the button-press is communicated to the host 316. The host, in response, sends one or more data files associated with the currently-active window in the host, to the flash peripheral 318 which then stores the data files in the flash memory 322. In order to complete items 316, 318, 322, which follow the single-press 312, no further user input is necessary other than that single-press of the button. It is, of course, possible to provide or allow additional user input following the single-press.

Figure 4:
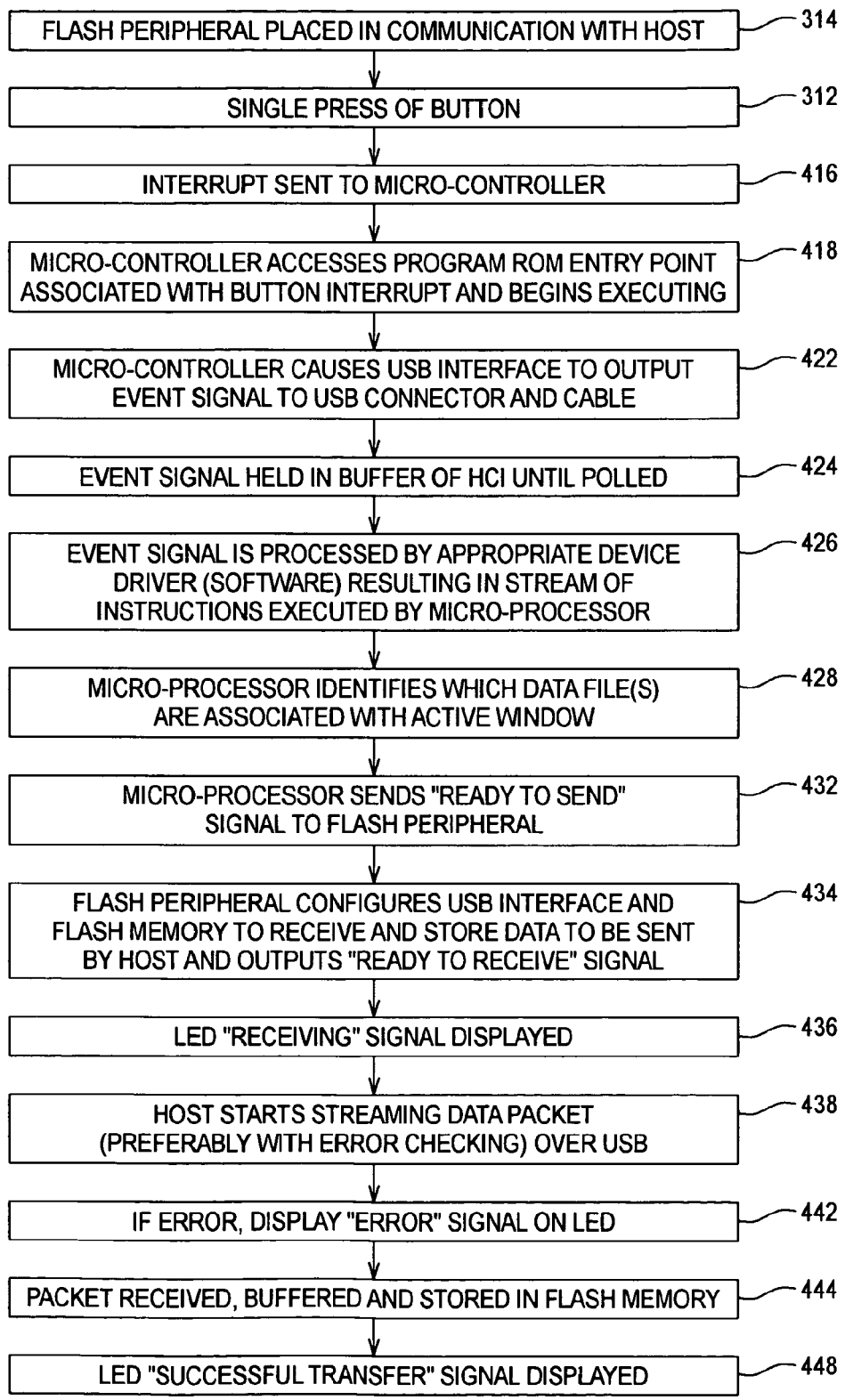
FIG. 4 is a flowchart of a process for download of data in response to a single-press of a button associated with a flash memory device according to an embodiment of the present invention.

FIG. 4 depicts a process generally in accordance with the embodiment of FIG. 3, but in greater detail. In the depiction of FIG. 4, following the single-press of the button 312 an interrupt signal (FIG. 1, 128) is sent to the microcontroller 416. The microcontroller 124 is configured to respond to the button-type interrupt by accessing a particular entry point in the program ROM 126 and to begin executing instructions from that point 418. The microcontroller's execution of these instructions results in the microcontroller 124 causing the USB interface 136 to output an event signal 422 over the USB connector 216 and cable 116. Preferably, communication of the event signal and other USB communications disclosed herein are in compliance with USB standards established by USB Implementators Forum Incorporated (USB-IF, at www.usb.org).

In the embodiment depicted in FIG. 4, the event signal sent over the cable 116 is held in a buffer of the head controller interface (HCI) 146 until this particular USB channel is polled 424. Upon such polling, the event signal is operated on by (e.g., causes execution of) the appropriate (USB) device driver (software) 426 resulting in a stream of instructions 152 which are executed by the microprocessor 142. As will be understood by those with skill in the art, the host typically includes a binding database which associates certain applications and/or files with various events and/or file types. In one embodiment, in response to receipt of a button-press event, the driver or other software sends a query to the binding database. The query is used to determine the identity of software which is bound to the "button press" event and/or device identification information. In some embodiments, the query may result in returning the name of an associated script file which may include, e.g., indications of drives, directories, sub-directories, files, file types and the like.

By way of executing instructions 152, the microprocessor identifies which data files are associated with the currently-running application or, in the parlance of Microsoft Windows® applications, data files associated with the active window 428. In this way, the system of FIG. 4 provides for downloading particular files without the need for additional input from the user. Other embodiments can provide for other file selection such as downloading those files which were most-recently stored, files with particular file extensions or types, and the like.

In one embodiment, the system is configured to download not only data files but (preferably conditionally) download programming information such as executable applications. For example, in one embodiment, if one or more Microsoft® Word data files are associated with the active window, the system will also download, to the flash device, one or more applications which can execute or operate on such data files. For example, a Microsoft® Word viewer application may be sent to the flash device. In this way the user can, later, upload, to a host, not only the data files but, if needed, applications for viewing or operating on the data files. This embodiment is believed to be particularly useful when the application is one which is not commonly available on personal computers (or other appropriate host devices) and/or when the user is expected to be unable or unwilling to select and launch appropriate applications in connection with the stored or downloaded data.

In the depicted embodiment, the microprocessor 142 sends a "ready to send" signal, e.g., over the USB cable 116, to the flash peripheral 432. The flash peripheral configures the USB interface 136 and flash memory 118 to receive and store the data to be sent by the host and outputs a "ready to receive" signal 434 over the USB cable 116 to the host. The flash peripheral also controls the LED 218 to display a "receiving" signal 436. A single LED 218 can be used to indicate various statuses such as using different flashing patterns, different colors and the like. Alternatively, other display devices can be used such as multiple LED's, liquid crystal displays and the like. Preferably, use of the flash memory device provides substantially no displays on the computer screen or, any such displays are preferably sized and positioned to provide little, if any, interference with other operations the user may be performing on the computer.

In response to receiving the "ready to receive" signal, the host 112 starts streaming data packets 438 containing the previously-identified data files 428. Preferably, the streaming of data packets is provided with checksum, cyclical redundancy check (CRC) or other error checking Some errors may initiate a re-send or a correction. In the depicted embodiment, certain errors, such as unrecoverable errors, result in the peripheral 114 causing the LED 218 to display an error signal 442. The packet data is received, buffered as necessary, and stored in flash memory of the flash memory peripheral 444. Upon successful transfer of the identified data files, a "successful transfer" signal is displayed on the LED 448.

In one embodiment, following a successful download of data, aspects of the flash device (such as program ROM entry points) are changed in order to modify the function which results from pressing the user-activatable button. For example, in one embodiment, following a successful download of a PowerPoint presentation and viewer, the flash memory device is modified so that the next time the button is pressed, the data now stored on the flash device, and the associated viewer program will be uploaded to a host device and executed thereon. An example in which this configuration might be useful would be in the context of a sales presentation when a potential customer wishes to have a copy of a PowerPoint® sales presentation. The presenter can insert an appropriately configured flash memory "stick" (www.memorystick.org) or similar device into the USB port of his or her computer and press the button, causing the currently-active PowerPoint® presentation and appropriate viewer to be loaded onto the memory stick which then has its button function reconfigured. The potential customer retains the memory stick and, when the customer connects the memory stick to his own computer and presses the button, the PowerPoint® presentation (and, if needed, a viewer) is uploaded (and preferably executed on the viewer) so that the potential customer can re-view the presentation.

Figure 5:
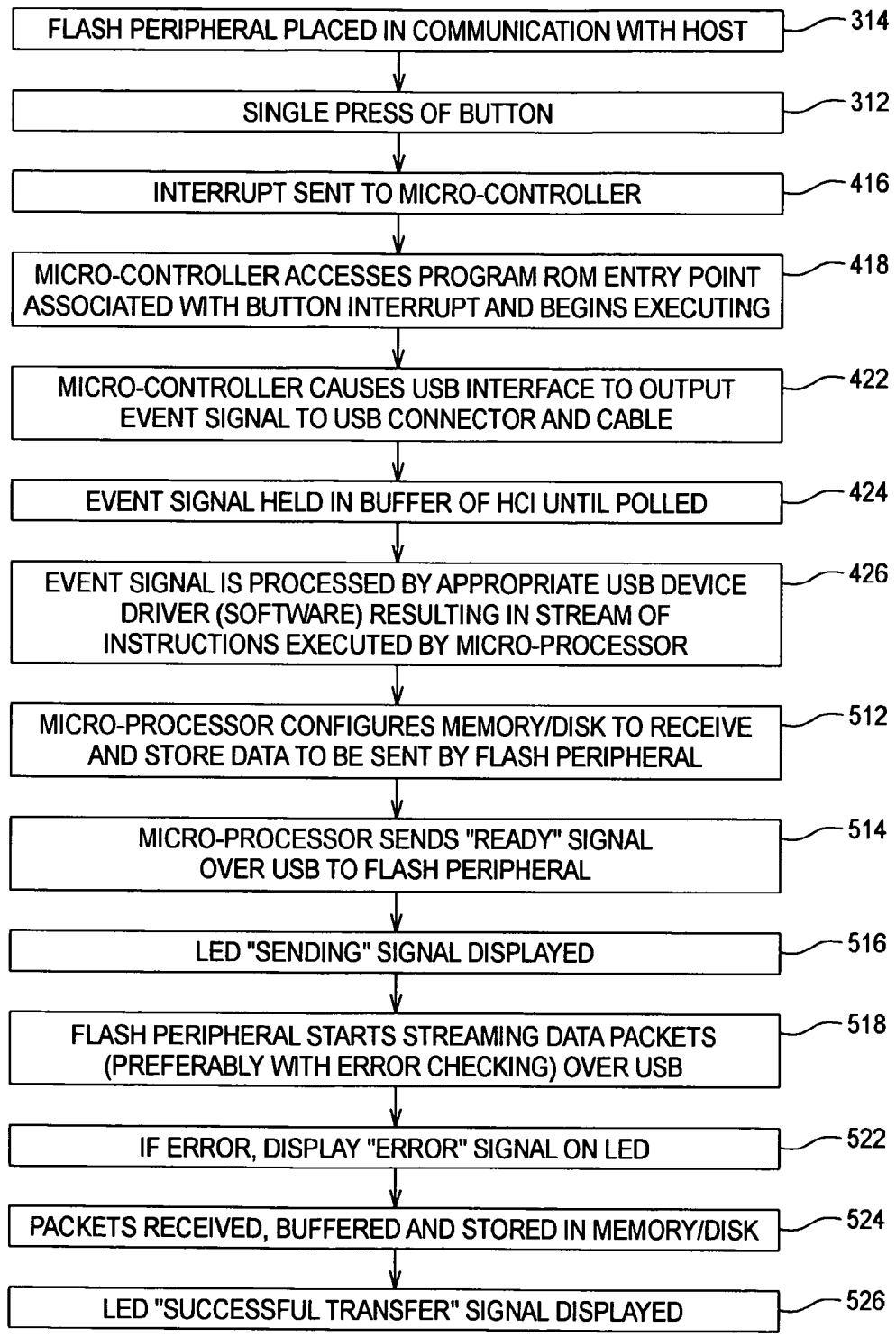
FIG. 5 is a flowchart of a process for uploading data in response to a single-press of a button associated with a flash memory device according to an embodiment of the present invention.

FIG. 5 depicts an embodiment which is similar in some respects to FIG. 4, but which provides for data to be uploaded (from the peripheral to the host) rather than downloaded. In the depiction of FIG. 5, steps 314, 312, 416, 418, 422, 424 and 426 are substantially similar to corresponding steps of FIG. 4. In FIG. 5, processing of the event signal causes the microprocessor to configure its own memory and/or disk 154, 156 to receive and store data to be sent by the flash peripheral 512. In the depicted embodiment, the host 112 is configured to provide for direct data transfer 162 between the USB connector (and HCI) and memory or disk. The present invention can also be used in systems which do not provide for direct data transfer. The microprocessor 142 sends a "ready" signal over the USB to the flash peripheral 514. Preferably, the flash peripheral causes the LED 218 to display a "sending" signal 516 and starts streaming data packets (preferably with error checking) over the USB cable 116 to the host 518. In response to at least certain errors, such as unrecoverable errors, the peripheral LED 218 (and/or the host) displays an "error" signal 522. The packets are received, buffered as necessary, and stored in the host memory or disk 524 and, upon completion of transfer, a "successful transfer" signal is preferably displayed on the peripheral LED 526 (and/or the host).

Figure 6:
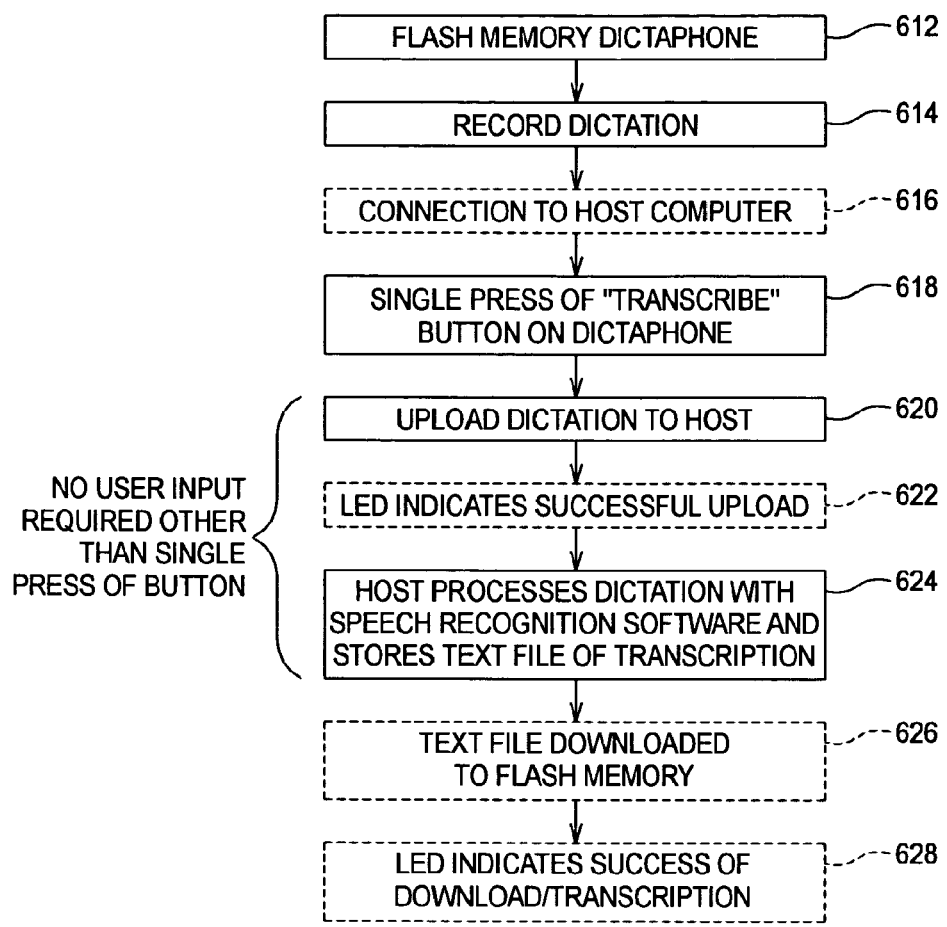
FIG. 6 is a flowchart of a process for uploading dictation data in response to a single-press of a button associated with a flash memory dictaphone according to an embodiment of the present invention.

Embodiments of the present invention can include processing by the host 112 in place of, or in addition to, storage on the memory or hard disk. In the embodiment of FIG. 6, the flash memory peripheral is a flash memory dictaphone 612. In this embodiment, after dictation is recorded 614 and a USB or other communication connection to the host computer is established 616, a single-press 618 of a button associated with the dictaphone causes the dictation audio file to be uploaded to the host 620, preferably with appropriate signals displayed on the dictaphone LED or other display device 622. In the depicted embodiment, the host processes the dictation file, e.g., with speech recognition software, and stores the transcription of the dictation as a text file 624. Uploading and transcription 620, 624 are provided without the need for any user input other than the single-press of the transcribe button. Optionally, the text file can be downloaded back to the dictaphone 626. Preferably, the dictaphone LED or other display device provides an indication of successful transcription and/or download 628.

Figure 7:
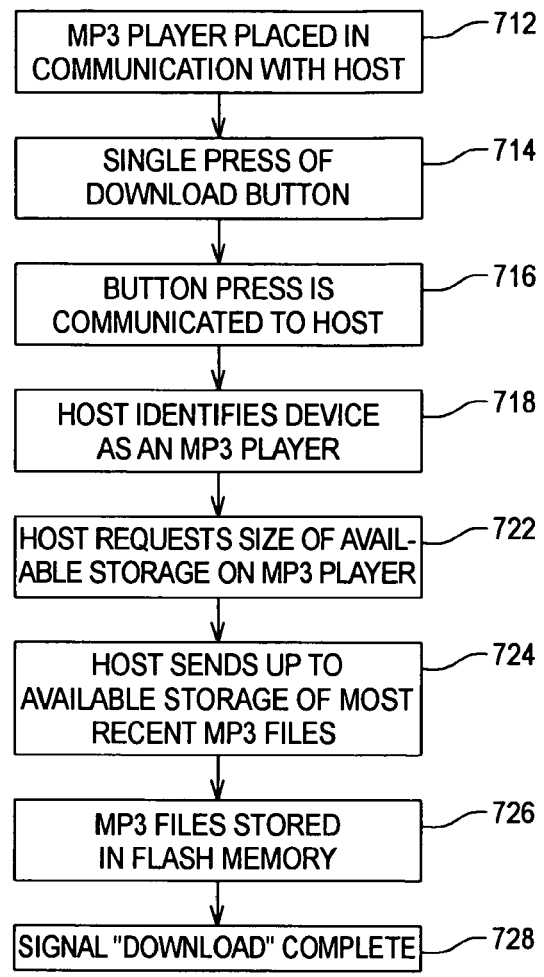
FIG. 7 is a flowchart of a process for downloading MP3 files in response to a single-press of a button associated with a flash memory MP3 player according to an embodiment of the present invention.

As depicted in FIG. 7, it is possible to download device-specific files, i.e., to select the files to be downloaded on the basis of the type of flash memory device. In the example of FIG. 7, the flash memory device is an MP3 player, placed in communication with the host. As will be clear to those with skill in the art, corresponding processes can be used for other types of flash devices such as downloading video files when the flash device is a video player, downloading photographs when the flash device is a photographic "frame" display, and the like. In the depicted embodiment, a single-press of a "download" button on the MP3 player 714 is communicated to the host 716. The host identifies the device as an MP3 player, e.g., based on device or type identification data sent when the device is first connected to the host, or as part of the button-press event notice 718. In the depicted embodiment, the host requests the size of available storage on the MP3 player 722. If desired, the system can be configured such that, in the event less than a predetermined amount of MP3 player memory is available, a predetermined amount of currently-used flash memory (selected, e.g., on the basis of oldest-recordings, least-frequently-played recording, or the like) will be designated as available for overwriting. The host then sends MP3 files having a cumulative size of up to the available storage, preferably giving preference to certain MP3 files such as those most-recently stored on the host 724. The MP3 files are then stored in the flash memory of the MP3 player 726. Preferably, an LED or other signaling component provides an indication after MP3 download is complete 728.

Figure 8:
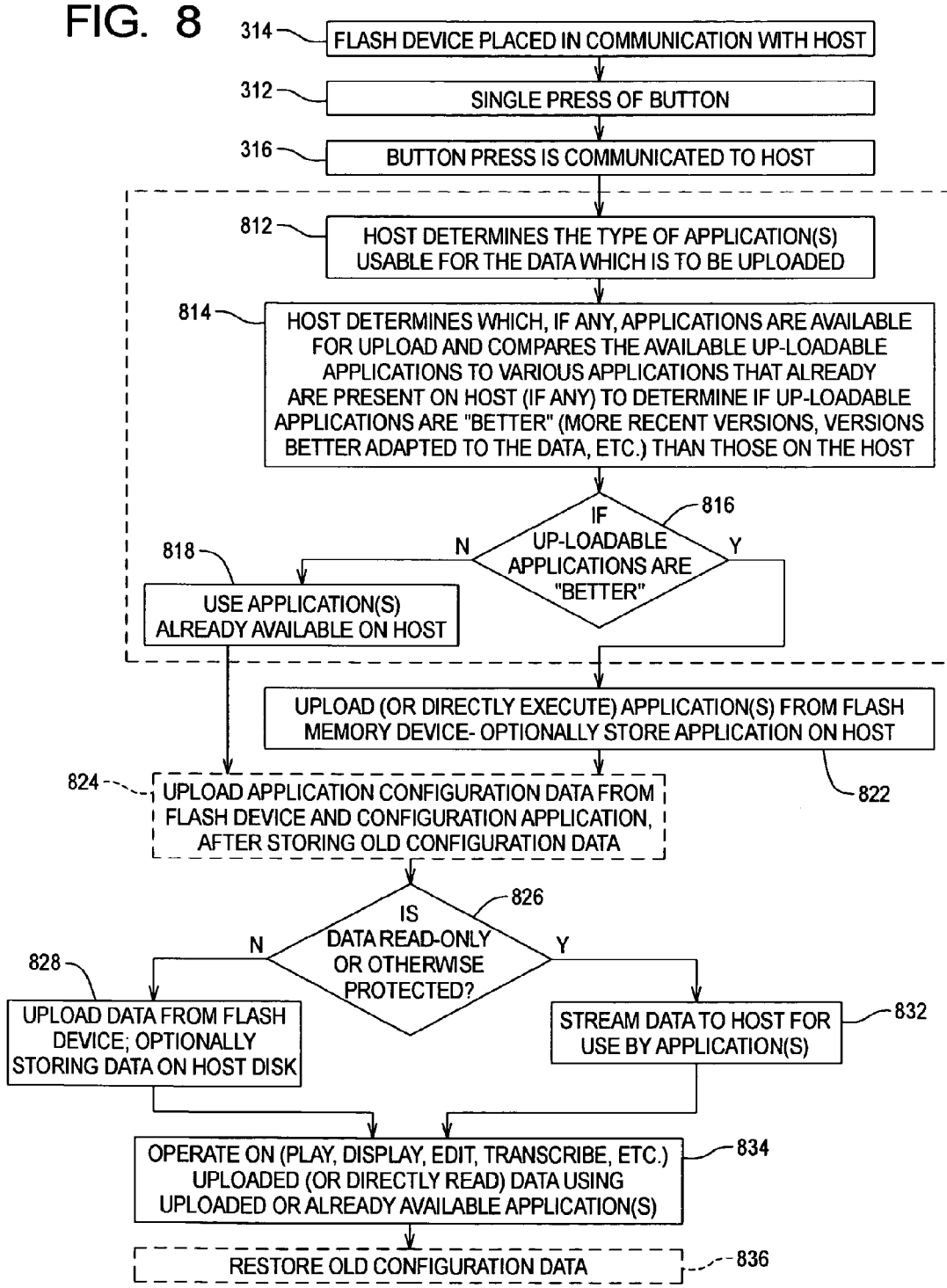
FIG. 8 is a flowchart of a process for uploading data-specific programming information in response to a single-press of a button associated with a flash memory device according to an embodiment of the present invention.

In the embodiment depicted in FIG. 8, the response to a single-press of a button includes an upload (from the flash device to the host) of one or more applications or other programming information which is preferably data-specific (configured for or compatible with the data) with respect to data on the flash device. In the depicted embodiment, in response to a single-press of the button 312 of a flash device which is in communication with the host 314, the button press event is communicated to the host 316. The host determines the type of applications which are useful for the data which is to be uploaded. For example, the host may receive information about the type of data to be uploaded from the flash device, either as part of the initial button event notification or in response to a query sent from the host to the flash device. As one example, if the data on the flash device which is to be uploaded includes files with a file extension indicating that they are Microsoft® PowerPoint presentations, then the host can determine that the type of application usable for the data includes such things as versions of Microsoft® PowerPoint or versions of Microsoft® PowerPoint Viewer. Although FIG. 8 is directed to a method in which the uploaded application is data-specific, it is also possible to provide embodiments in which uploaded applications are device-specific (e.g., such that if the host determines that the flash device is a dictaphone, the uploaded application might be a transcription or speech recognition application.)

After the host has determined the type of application 812, the host then determines which, if any, applications are on the flash device and are available for upload (or, in some embodiments, for direct execution without prior storage on the host) 814. Preferably, the applications available for upload from the flash device are compared to those applications which may already be available on the host. This comparison is performed in order to determine if the up-loadable applications are, according to one or more criteria, "better" (such as being more recent versions, being versions better adapted to the data, etc.) compared to those applications already on the host. If the up-loadable applications are not better than the applications already available on the host 816, then the host applications are used 818. Otherwise, the applications on the flash memory are uploaded (or streamed for direct execution). Optionally, if permitted, the applications uploaded from the flash device are stored on the host for possible future use 822. For example, "albums" of MP3 music stored on a flash memory stick can be included, on the stick, along with an MP3 player. Thus, merely by playing purchased music albums, the user will automatically have the most recent versions of MP3 players made available on the host.

Optionally, configuration information is uploaded from the flash device for use in connection with the application which will play or display the data (or otherwise execute). For example, a sales representative who, by a single-press of a button on, e.g., a memory stick, provides a customer with a memory stick containing a PowerPoint® sales presentation preferably also provides on the memory stick (without the need for further input beyond the single-press) configuration data to ensure that the PowerPoint® application is appropriately configured (e.g., so that the sales presentation is accurately reproduced when the customer plays it back on his or her own host device, which will typically be different from the host device). Examples of configuration information include items which are typically set using the operating system (screen resolution, color resolution, and the like), as well as items that are set via the application (such as slide show display rate, and the like). Preferably, any current or previous configuration data residing on the host is stored before the new configuration data is applied (in order to permit the host device to be reconfigured to its prior state after using the uploaded configuration data).

Provided the data (which is to be executed by the applications) is not read-only or otherwise protected, the data is then merely uploaded from the flash device, e.g., and stored on the host disk 828. However, if the data on the flash device is read-only data or is otherwise protected, the manner of transfer to the host must be appropriately handled. For example, if the system is configured such that read-only data cannot be copied to the host disk, one option will be to stream the data to the host for use by the application 832, i.e., without prior storage of the (entire) data file on the host. Depending upon the type of data security provided for the data on the flash device, it may be possible to make one or more copies of the data for storage, e.g., on the host disk, possibly with the requirement that the copied data itself be designated as "read-only." In some embodiments, the uploaded application will be especially configured or designed to provide appropriate operation on the host device (view-only, one-time decryption and the like) for particular types of data protection.

The data which is uploaded or streamed from the flash device is operated on (e.g., such as by playing, displaying, editing, transcribing, etc.) using either the uploaded application 822 or one or more applications already available on the host 818. At the end of the playback or other execution (or, optionally, upon closing the application) the old configuration data is restored 836.

Figure 9:
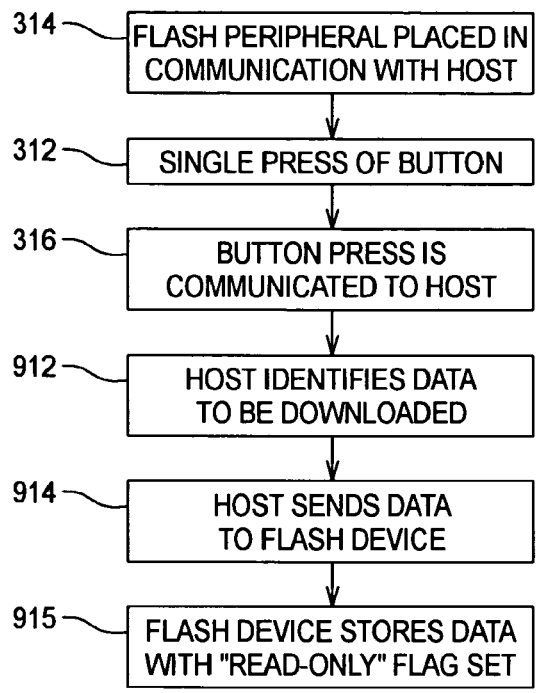
FIG. 9 is a flowchart of a process for providing security of downloaded data in response to a single-press of a button associated with a flash memory device according to an embodiment of the present invention; and, FIG. 10 is a flowchart of a process for using data of the type downloaded and protected by the process illustrated in FIG. 9, according to an embodiment of the present invention.

FIG. 9 provides or illustrates an embodiment providing for security in the downloaded data. In this embodiment, following a single-press of a button 312 on a flash peripheral which has been placed in communication with the host 314, the button press is communicated to the host 316. The host identifies the data which is to be downloaded 912 using any of various processes, including as described above. The host then sends the identified data to the flash device 914. The flash device stores the data while providing a type of data security or protection, in this case, setting a "read-only" flag which identifies the data as "read-only" data. Various other types of data or levels of data protection can also be used in embodiments of the present invention including other types of flags such as write-once flags, copy-once flags, copy-N flags, various types and/or levels of encryption and the like.

Figure 10:
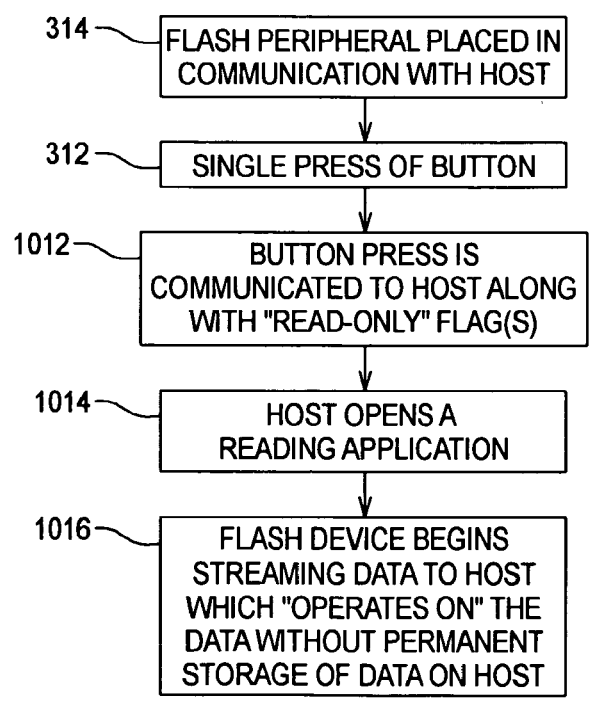

FIG. 10 shows how read-only data, e.g., as provided according to the process of FIG. 9, can be used. According to FIG. 9, following the single-press of a button 312 on a flash peripheral in communication with the host 314, not only is the button press communicated to the host but also the "read-only" flag or flags applicable to the data to be uploaded 1012. In response, the host opens an appropriate (e.g., data reading or viewing) application 1014. This application will be appropriate for (or will be configured to be appropriate for) treatment of "read-only" data. For example, if the data file is a read-only Microsoft® Word file, the host could open a Microsoft® Word Viewer application which has (or which has been configured to have) no capability to edit, save or copy a data file. The flash device then begins streaming data to the host which "operates" on the data (such as displaying the data) without making a permanent copy on the host of the data which is streamed 1016. As will be clear to those with skill in the art, depending on the type of data and/or type of application, it may be necessary to place a copy of some or all of the data streamed from the flash device, in, for example, random access memory (RAM) of the host, e.g., with the restriction that the data will not be permanently stored following the "read-only" use of the data (for example, will not be normally stored on the host disk drive). For example, if the uploaded data is a single photograph and the application is a photo-viewing application, the viewing of the photograph is normally performed in conjunction with storing the entire photographic data in host RAM, video memory or the like.

TABLE I

| Involvement of Host | Involvement of Flash Device |
| --- | --- |
| None | All files downloaded in response to button press are protected ("read-only" or otherwise) |
| Host encrypts or otherwise protects all data sent to flash device in response to button press | None |
| Host performs the type or object of encryption specified by flash device | "Button-press event" message (or subsequent message to host) tells host which files (or file types) to encrypt and/or how to encrypt (or otherwise protect) (may need to upload encryption application, keys, etc.) |
| Host sends message to flash device specifying which files (and/or how) to "read-only" (or otherwise) protect downloaded files | Flash device performs type or object of protection specified by host |

The examples of FIGS. 9 and 10 illustrate a situation in which substantially all of the data security protection measures occur on, or within, the flash device (namely setting the read flag) and the host is not involved in establishing or creating the security procedures (other than selecting and/or executing applications which are capable of properly handling "read-only" type data). Table I indicates, in its first entry, this type of a system, in which the host has substantially no involvement in creation of the security for the stored data and all of the data security is created or initiated substantially by the flash memory device. Table I illustrates several other possible approaches (not necessarily exhaustively). For example, Table I, illustrates a situation in which the flash device performs substantially no part of the creation of the security features, and in which the host device encrypts (or otherwise protects) all data sent to the flash device in response to a single button press. Table I also illustrates examples of shared security. In one example, the flash device is configured such that the "button press event" message (or a subsequent message sent to the host) tells the host which files (or file types) to encrypt (or otherwise protect), and/or how to encrypt the information. In some configurations, the flash device may also need to upload the associated information such as encryption applications, keys and the like. The host, in response, performs the type of encryption, or selects the files to be encrypted, as specified by the flash device. Table I also provides an example in which, following the single-press, the host sends a message to the flash device specifying which files to flag as "read-only" or how to otherwise protect downloaded files. The flash device performs the type of protection specified and/or provides protection for the files identified by the host.

A number of variations and modifications of the invention can also be used. In general, it is possible to use some aspects of the invention without using others. For example, it is possible to provide for data or programming transfer in response to a single-press of a flash memory device button without providing for error checking or correction. It is possible to provide for flash memory devices with single-button functionality which do not have an LED or similar display device. Although a number of processes have been described, illustrating various embodiments of the invention, in general, it is possible to use embodiments of the present invention in connection other processes or in connection with processes which have more, fewer or different steps then those illustrated.

Although embodiments have been described in which flash memory forms the sole mass storage in a peripheral for storing data or transferable programming, it is possible to provide embodiments of the present invention in which the peripheral includes other mass storage or data storage components in addition to flash memory. As used herein, transferable programming includes programs or portions thereof which can be transferred to the host device for execution thereon (as opposed to, e.g., programming which is used or executed only on the peripheral device).

Although the system of FIG. 1 illustrates a host in which a microprocessor 142 uses polling 144 of the host controller interface (HCI) 146, the present invention can also be used in contexts where the host uses an interrupt system.

In some embodiments, the selection of which data is to be transferred can be made in a number of different ways. According to one approach, the host's device driver 148 always selects files according to a single criterion (most recent files, files of a certain type, etc.) whenever it receives a flash device button-press notice. In another embodiment, the device driver is configured to select any of several different types of files depending upon one or more selection factors. Examples of selection factors can include such things as the type of flash device, types of files or applications which may already be present on the flash device (e.g., downloading PowerPoint, data files if a PowerPoint Viewer is present on the flash device), time of day (e.g., performing a hard disk backup if local time is between midnight and 4:00 a.m.), and the like. Selection factors may be factors which are known or determined solely by the host (such as time of day) or may be selection factors which are obtained from the flash device (such as types of files already present) either obtained in response to a query sent from the host to the flash device as part of the execution of the device driver, or included in the initial button notification sent from the flash device to the host.

In one embodiment, one or more device drivers (or parameters to be used by the device driver such as one or more file name extensions) may be stored on the flash device and sent to the host, at least if appropriate device drivers are not already present on the host, as part of, or following, transmittal of the button press event notice.

In one embodiment, the host device obtains information identifying the files and/or versions already present on the flash device, and avoids downloading files which are already present.

Although, embodiments have been provided describing a USB communication channel, other types of communication can be used including an IEEE1394 (fire wire) channel and Ethernet channel, a wireless communication link and the like.

Preferably, embodiments are provided which permit the flash memory device to be connected and/or disconnected without having to shut down or reboot the computer ("hot swapping").

Although, it is possible to provide embodiments in which the button on the flash memory device is dedicated to a single function, it is also possible to provide embodiments in which there is substantial flexibility in use of the button such as by allowing the user to select or program the function to be performed in response to the button push.

A number of types of buttons can be used including electromechanical push buttons, heat sensitive switches, membrane switches, piezoelectric switches, proximity switches, heat sensing switches, touch screens, voice activation systems, biometric sensors and the like. Although embodiments of the present invention have described positioning a button or other user input device substantially rigidly coupled to the chassis or body of the flash memory device, it is also possible to associate a button or other external or other user input device with the flash memory device including, e.g., providing a button or other user input device which is flexibly connected such as by a ribbon connector, cable or the like, providing a wireless link, and the like.

In one embodiment, the function of the button may be changed or modified prior to successful completion of a download or upload such as to provide a modified function during a download or upload. For example, the flash memory device can be configured such that if the button is pressed during a download or upload operation (e.g., as indicated by the LED) such button press will result in aborting the download or upload.

In light of the above description a number of advantages of the present invention can be seen. The present invention can avoid certain types of user inconveniences, including those associated with the need to perform multiple steps or actions in order to achieve functions such as downloading or uploading data or programming information.

The present invention can provide greater control compared to corresponding devices or processes which initiate functions upon insertion or coupling of a peripheral device. The present invention can provide for user convenience in the backup or copying of host files, downloading of content to flash-based player or viewer devices, data-specific and/or device specific transfer of applications and/or data and the provision of data security.

The present invention can minimize impact on ongoing computer operations such as reducing or avoiding the need for occupying display screen windows or otherwise occupying space on the display screen, during, or as part of, operations involving the flash device. The present invention involves a relatively rapid transfer of data and/or programming information (e.g., compared with a CD-based backup) and can avoid the need for inserting, labeling and/or locating multiple disks.

The present invention, in various embodiments, includes components, methods, processes, systems and/or apparatus substantially as depicted and described herein, including various embodiments, sub-combinations, and subsets thereof. Those with skill in the art will understand how to make and use the present invention after understanding the present disclosure. The present invention, in various embodiments, includes providing the devices and processes in the absence of items not depicted and/or described herein or in various embodiments hereof, including in the absence of such items as may have been used in previous devices or processes, e.g., for improving performance, achieving ease of implementation and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the forms or form disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An apparatus comprising:
    a first memory device configured to communicate with a second memory device over a communications link;
    a user-activatable button communicatively coupled to the first memory device, that when activated, causes a file saved on the first memory device to be selected based on at least one criterion and uploaded to the second memory device.

2. The apparatus of claim 1, wherein the criterion includes at least one of when the file was saved, last use of the file, or version number of the file.

3. The apparatus of claim 1, wherein the first memory device includes a signaling component mounted thereon, controlled by the first memory device, to indicate an upload status of the file.

4. The apparatus of claim 1, wherein the signaling device comprises at least a LED.

5. The apparatus of claim 1, wherein the user-activatable button is communicatively coupled to the first memory device via a wireless link.

6. The apparatus of claim 5, wherein the user-activatable button is a touch screen.

7. The apparatus of claim 1, wherein the first memory device performs error checking on data selectively uploaded to the second memory device.

8. The apparatus of claim 1, wherein the file saved on the first memory device is selected without the need for user input other than activation of the user-activatable button.

9. A method comprising:
    coupling a first memory device to a second memory device to permit communication with the second memory device over a communications link;
    receiving input via a user-activatable button associated with the first memory device;
    initiating a first function of the first memory device responsive to the receiving operation;
    reconfiguring memory of the first memory device such that input subsequently received via the user-activatable button initiates a second function of the first memory device different from the first function.

10. The method of claim 9, wherein the first function includes communication of data from the second memory device to the first memory device.

11. The method of claim 9, wherein the second memory device encrypts the data responsive to receiving operation.

12. The method of claim 9, wherein the first function or the second function includes transferring programming information.

13. The method of claim 9, wherein the first function includes selecting a data file for a download or upload operation without receipt of user input other than the input received via the user-activatable button.

14. The method of claim 9, wherein the second function includes uploading data from the first memory device to a coupled host device.

15. The method of claim 14, wherein the coupled host device is different from the second memory device.

16. The method of claim 9, wherein the user-activatable button comprises a touch screen or a voice activation system.

17. The method of claim 9, wherein the reconfiguring operation comprises changing an entry point in a program memory.

18. An apparatus comprising:
    a first memory device configured to communicate with a second memory device over a communications link;
    input means for receiving user input, the input means communicatively coupled to the first memory device;
    means for selecting a data file associated with an active window on a host device responsive to receipt of the user input; and
    means for transferring the selected file between the first memory device and the second memory device.

19. The apparatus of claim 18, wherein the means for transferring is a means for downloading a data file from the second memory device to the first memory device.

20. The apparatus of claim 18, wherein the second memory device is a host device and the means for selecting is a means for selecting a data file associated with an active window on the host device.

21. The apparatus of claim 18, wherein at least one of the means for selecting and the means for transferring comprises at least first driver software executing on the second memory device.

22. The apparatus of claim 18, wherein the means for transferring transfers the selected file without receiving additional user input.

* * * * *